(12) United States Patent  (10) Patent No.: US 8,271,685 B1
Reeves et al.  (45) Date of Patent: Sep. 18, 2012

(54) INTELLIGENTLY ASSIGNING AN IP ADDRESS TO A MOBILE DEVICE

(75) Inventors: Raymond Emilio Reeves, Olathe, KS (US); Ryan Alan Wick, Apollo Beach, FL (US); Wen Xue, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 287 days.

(21) Appl. No.: 12/581,353

(22) Filed: Oct. 19, 2009

(51) Int. Cl.
*G06F 15/16* (2006.01)
(52) U.S. Cl. .................. 709/245; 709/226; 455/437
(58) Field of Classification Search .................. 709/245, 709/226; 455/437
See application file for complete search history.

(56) References Cited

U.S. PATENT DOCUMENTS

| | | | |
|---|---|---|---|
| 7,924,789 B1* | 4/2011 | Breau et al. | 370/331 |
| 2001/0021659 A1* | 9/2001 | Okamura | 455/557 |
| 2002/0113762 A1* | 8/2002 | Ha | 345/87 |
| 2004/0156348 A1* | 8/2004 | Cheng et al. | 370/338 |
| 2005/0094599 A1* | 5/2005 | Ryu et al. | 370/331 |
| 2006/0159048 A1* | 7/2006 | Han et al. | 370/331 |
| 2008/0102843 A1* | 5/2008 | Todd et al. | 455/445 |
| 2008/0280607 A1* | 11/2008 | Kanto et al. | 455/435.1 |
| 2010/0112986 A1* | 5/2010 | Ellingham et al. | 455/414.1 |

* cited by examiner

*Primary Examiner* — Ario Etienne
*Assistant Examiner* — El Hadji Sall

(57) ABSTRACT

Ways of allocating an identifier to a mobile device are disclosed. One method includes receiving a request that requests an address be assigned to the mobile device, considering factors in connection with determining a mobile IP (MIP) address to be assigned to the mobile device, determining the MIP address based on the factors, and conveying the MIP address to the mobile device.

19 Claims, 4 Drawing Sheets

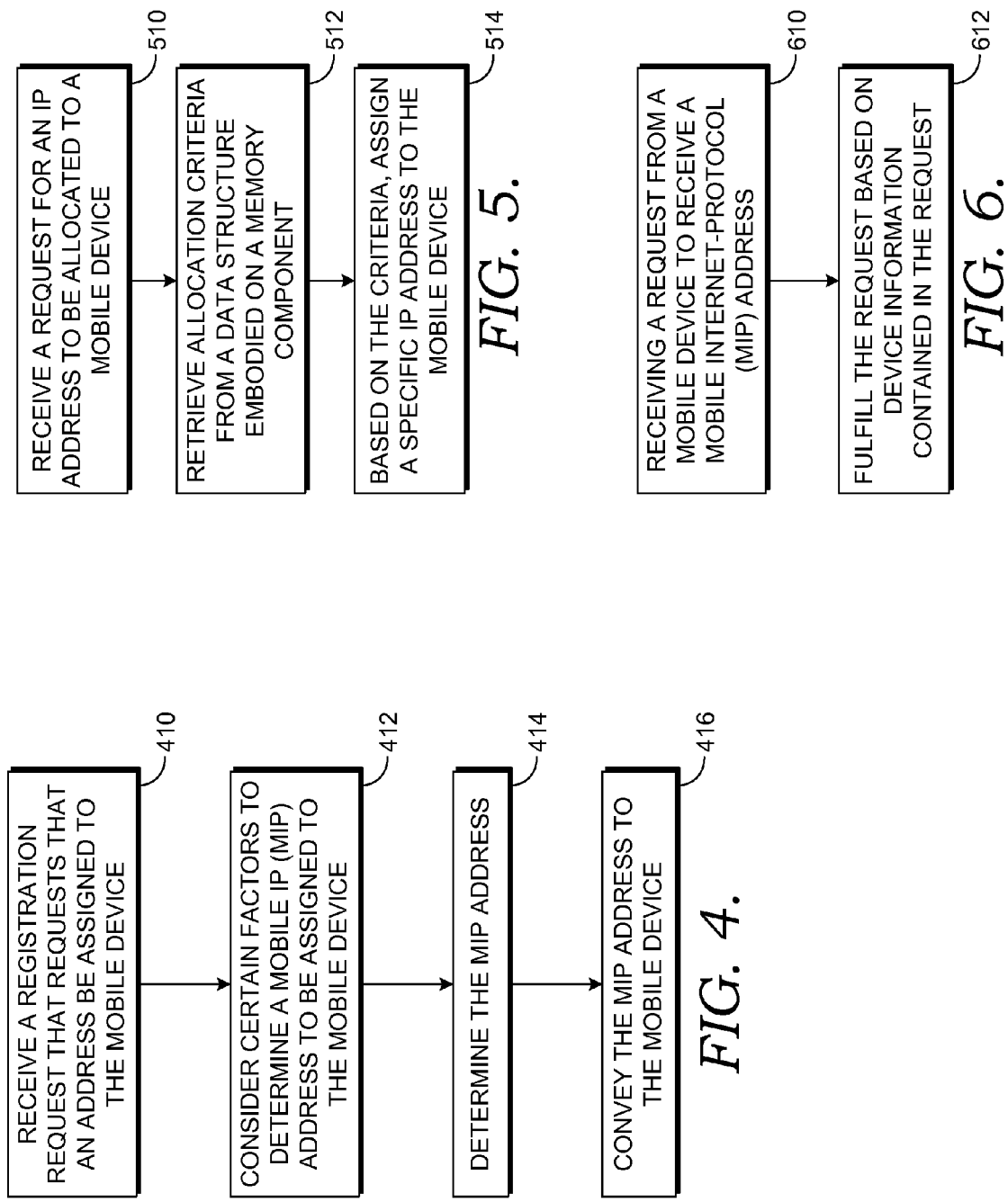

INTELLIGENTLY ASSIGNING AN IP ADDRESS TO A MOBILE DEVICE

SUMMARY

Embodiments of the invention are defined by the claims below, not this summary. A high-level overview of various aspects of the invention are provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter.

In brief and at a high level, this disclosure describes, among other things, ways of intelligently assigning an IP address to a mobile device that uses it to communicate with other devices that rely on the mobile IP address. In one embodiment, this functionality is carried out by way of a modified home agent (via embodied instructions 231 for example), and in other embodiments a separate address-allocation server is employed. Instead of random or no strategy being applied, a set of rules used in connection with selection criteria is employed to intelligently determine an IP address to be allocated to the mobile device.

BRIEF DESCRIPTION OF THE SEVERAL VIEWS OF THE DRAWINGS

Illustrative embodiments of the present invention are described in detail below with reference to the attached drawing figures, wherein:

FIGS. 4-6 depict illustrative methods for intelligently assigning an IP address to a mobile device.

DETAILED DESCRIPTION

Figure 1:
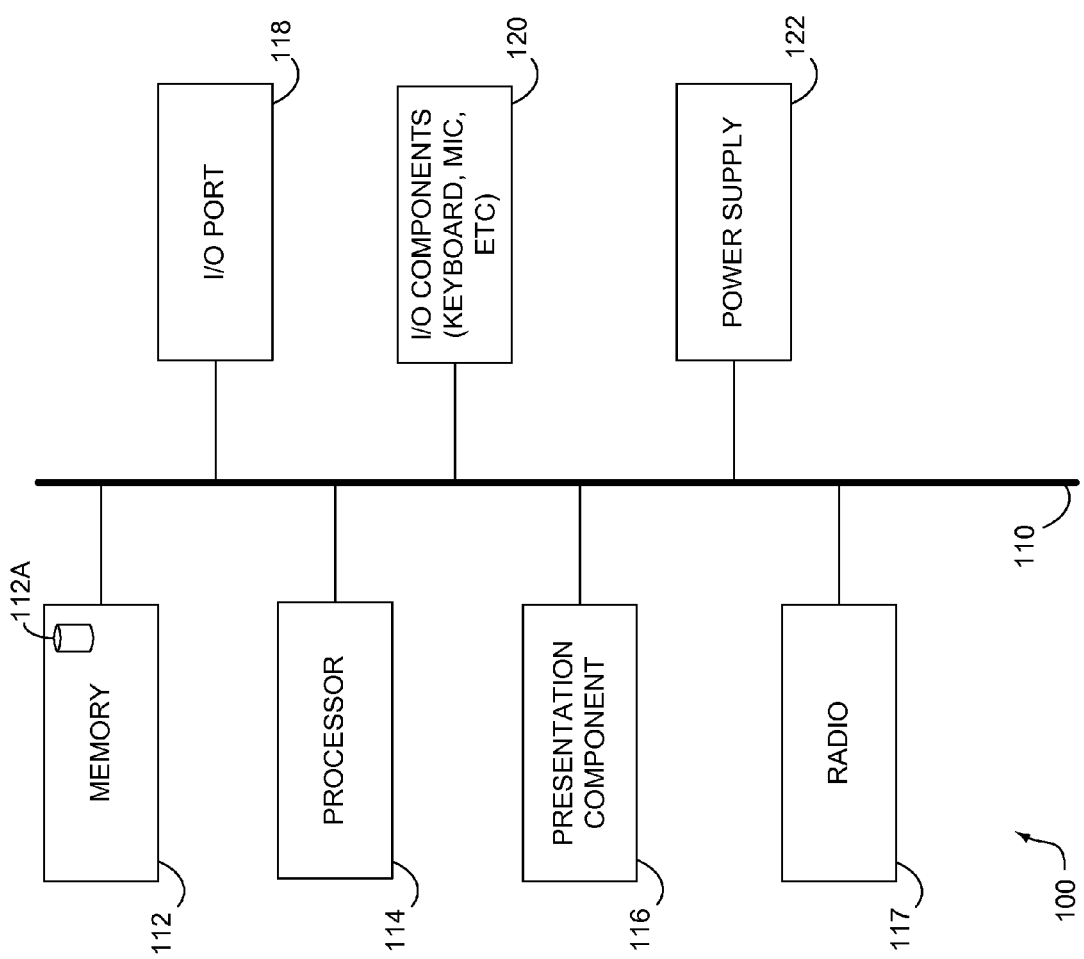
FIG. 1 depicts an illustrative device suitable for use in connection with an embodiment of the present invention.

The subject matter of the present invention is described with specificity herein to meet statutory requirements. However, the description itself is not intended to define the invention, which is what the claims do. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| AAA | Authentication, Authorization, and Accounting |
| BSID | Base-Station Identifier |
| BTS | Base Transceiver Station/Base Station |
| CDMA | Code Division Multiple Access |
| DPI | Deep-Packet Inspection |
| FA | Foreign Agent |
| GIS | Geographic/Geospatial Information System |
| GGSN | GPRS Gateway Support Node |
| GPRS | General Packet Radio Service |
| GSM | Global System for Mobile communications (Groupe Special Mobile) |
| IP | Internet Protocol |
| LED | Light Emitting Diode |
| MIP | Mobile IP |
| NAI | Network Address Identifier |
| PDA | Personal Data Assistant |
| PDSN | Packet Data Serving Node |
| SGSN | Serving GPRS Support Node |
| TDMA | Time division multiple access |
| UMTS | Universal Mobile Telecommunications System |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

We previously have described various memory components that memory 112 might take the form of. Thus, we will not elaborate more here, only to say that memory component 112 can include any type of medium that is capable of storing information (e.g., a datastore 112A). Processor 114 might actually be multiple processors that receive instructions and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

Figure 2:
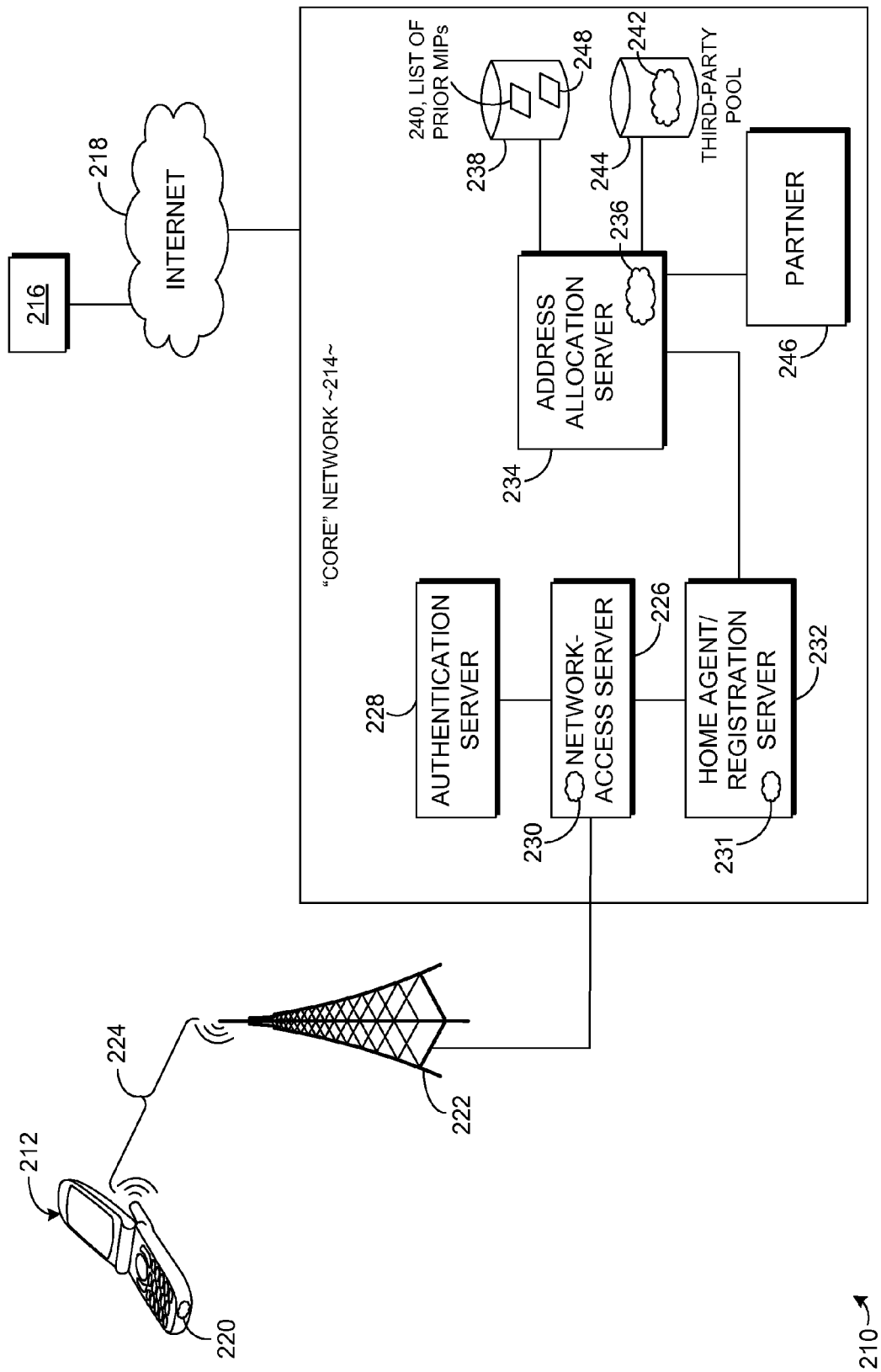
FIG. 2 depicts an illustrative operating environment suitable for practicing an embodiment of the present invention.

Turning now to FIG. 2, an illustrative operating environment is provided and referenced generally by the numeral 210, which depicts an illustrative wireless-telecommunications networking environment that enables a mobile device 212 to communicate through what is referred to as a core network 214 to reach an end device 216 by way of the Internet 218.

Mobile device 212 is the type of device described in connection with FIG. 1 in one embodiment. It includes a client application 220 that helps carry out aspects of the technology described herein. Whenever we speak of an application, software, or the like, we are really referring to one or more computer readable media that is embodied with a set of computer-executable instructions that facilitate various actions to be performed. We will not always include this lengthy terminology because doing so would make this document more difficult to read.

Mobile device 212 communicates with a base transceiver station (BTS) 222 by way of a communications link 224. BTS 222 provides access to what some skilled artisans refer to as a core network. We do not mean to imply that the item referred to in FIG. 2 by reference numeral 214 is the only form of a core network that is possible. To the contrary, not all components that make up core network 214 are shown, and some of the components that are shown as being within core network 214 do not need to be. Also, not all connections or possible connections are shown (such as, for example, between authentication server 228 and address-allocation server 234 for example).

One of the components that helps facilitate communication between mobile device 212 and other networks (not shown) as well as the Internet 218 is a network-access server 226. Network-access server 226 is also known by some skilled artisans as a packet data serving node (PDSN). Similarly, others might refer to this device 226 as a foreign agent. Network-access server 226 helps manage communications sessions between data core 214 and base station 222. Any device that provides similar functionality is contemplated within the scope of this disclosure. For example, a GSM offers similar functionality in networks that utilize GSM or UMTS technology. At a high level, network-access server 226 helps provide access to the Internet as well as to other network technologies such as Intrudnet(?) and application services. It helps provide mobile IP (MIP) access, one-agent support, and transportation of packets to facilitate the funneling or communicating of data through virtual private networks. It can act as a client for authentication server 228, which helps insure that mobile device 212 is authorized to communicate via the wireless telecommunications network. In some embodiments, authentication server 228 is known as an application, authorization, on accounting (AAA) server. But it can be any device that helps authenticate mobile device 212. In one embodiment, network-access server 226 includes a set of computer executable instructions 230 that help carry out various aspects of technology described herein.

As mentioned, some components are not depicted on FIG. 2 so as to not obscure aspects of the various embodiments of the present invention. For example, a radio network controller often sits between BTS 222 and network-access server 226, although its functionality can be subsumed into other elements. We have included a selection of components so as to not obscure more relevant aspects of the technology that we are describing.

Generally, in this disclosure, when we speak of communicating data we are referring to any action that requires mobile device 212 to have an IP address in order to carry out some action. Mobile device 212 might attempt to access items such as the Internet 218 as well as other components that might alone or in combination facilitate things such as television reception, e-mail reception, picture mail, video mail, video conferencing, and the like. Thus, the type of the technology that is being described in this disclosure generally relates to what is often referred to as "data" traffic as opposed to voice traffic to the extent there is a difference. In some technologies such as voice-over-packet technologies, there is not as much distinction between voice and data. But to the extent communicating data requires that mobile device 212 be given an IP address, the technology that we are describing provides an intelligent way of assigning an IP address to mobile device 212.

In some prior-art technologies, home agent 232 (ingloriously referred to as a registration server) is responsible for assigning a mobile IP address to mobile device 212. That is, a PDSN would request a mobile IP address from home agent 232, which would assign an IP address without employing any sort of a strategy. That is, home agent 232 would assign any IP address available, perhaps at random, or perhaps in some sequential order; but in any case, without employing a strategy in making a decision as to which mobile IP address should be given to mobile device 212.

But our technology allows for a strategy to be applied in connection with assigning an IP address to mobile device 212. In some embodiments, home agent 232 interacts with an address allocation server 234, which includes an application 236, to determine an IP address that should be allocated to mobile device 212. Application 236 employs one or more of various algorithms in order to determine an appropriate IP address that should be allocated to mobile device 212. Home agent 232 provides information to address allocation server 234. For example, home agent 232 provides a device identifier and/or a user identifier that is associated with mobile device 212. The device ID can take the form of any identifier that is capable of uniquely identifying mobile device 212. Illustrative examples of such identifiers include a mobile device number, a hexadecimal identification code, a decimal identification code, an electronic serial number, or any other identifier that is usable to uniquely identify mobile device 212 on the network. The user ID takes the form of a network address identifier (NAI) in one embodiment. This NAI identifies the user associated with mobile device 212. A network is able to access an array of demographic information associated with a user ID by retrieving a profile from a database (not shown) that stores information about users that use the telecommunications network of FIG. 2.

Thus, application 236 is aware of the type of device that mobile device 212 is as well as a user associated with the device. By virtue of these two identifiers, address allocation server 234 is also aware of a geographic area associated with mobile device 212, technical capabilities of mobile device 212, and any business arrangements or associations that stem from the corresponding user. For example, perhaps the user is an employee of XYZ Corporation. Application 236 would have access to this information when determining a strategy to allocate an IP address to mobile device 212.

The numbers of and various types of strategies that could be employed are legion. We will mention a few for illustrative purposes, but the same should not be construed as limiting in nature. Our technology contemplates leveraging information about the device requesting an IP address in order to determine an IP address to be allocated to the device in situations where a determination is to be made. For example, an IP address is to be assigned based on one or more of the device ID or the user ID. Another strategy could be to assign an IP address based on the geographic location of mobile device 212. Another strategy might be to use a designated pool of mobile IP addresses. In this way, a database 238 might house a pool of IP addresses usable to be assigned to mobile device 212. As will be explained in greater detail below, embodiments of the present invention contemplate keeping track of prior mobile IP addresses that work or do not work. This list of prior mobile IP addresses is referred to by numeral 240. If certain prior addresses have been known to work, then those can be reallocated to device 212 or a device similar to device 212. Similarly if certain IP addresses have been known to not work with device 212, then those IP addresses can be excluded from options that are available to be assigned.

In other embodiments, perhaps a third-party pool addresses 242 are to be used. One way that this might be the case is when mobile device 212 belongs to a user who is an employee of a large organization or any organization who desires that an IP address be assigned from one of its pools, which is stored in a database 244 in one embodiment. The large organization might have purchased a block of IP addresses and not want to pay for the technology associated with determining what IP address of another core should be used. In this way, our technology can accommodate this desire by retrieving an IP address from the third-party pool 242. In even more extreme embodiments, reference can be made to a partner 246, which determines an IP address to be allocated to mobile device 212.

As briefly mentioned, sometimes certain IP addresses do not work. That is, a mobile device such as a mobile phone or PDA attempts to interact with the Internet by way of an assigned IP address but is not allowed to. The IP address prevents the mobile device from communicating in a desired way. Sometimes individuals will reboot their phones or other mobile devices in an attempt to resolve the issue. But some prior-art technologies wind up assigning the exact same IP address that gave rise to the issues. Our technology could prevent this from happening by intelligently assigning an IP address to mobile device 212.

Although we have described an embodiment that utilizes an address allocation server 234, an embodiment of the invention contemplates modifying home agent 232 to carry out the tasks that we have discussed in connection with address allocation server 234. In some embodiments, this includes facing application 236 on home agent 232. Moreover, we do not mean to imply that the servers that are referred to by name in FIG. 2 must be different physical components. It is commonplace to have a file server and an e-mail server actually be the same server, or reside in the same inbox and use the same components. We provide names so as to refer to different devices in connection with explaining various aspects of embodiments of the present invention.

Figure 3:
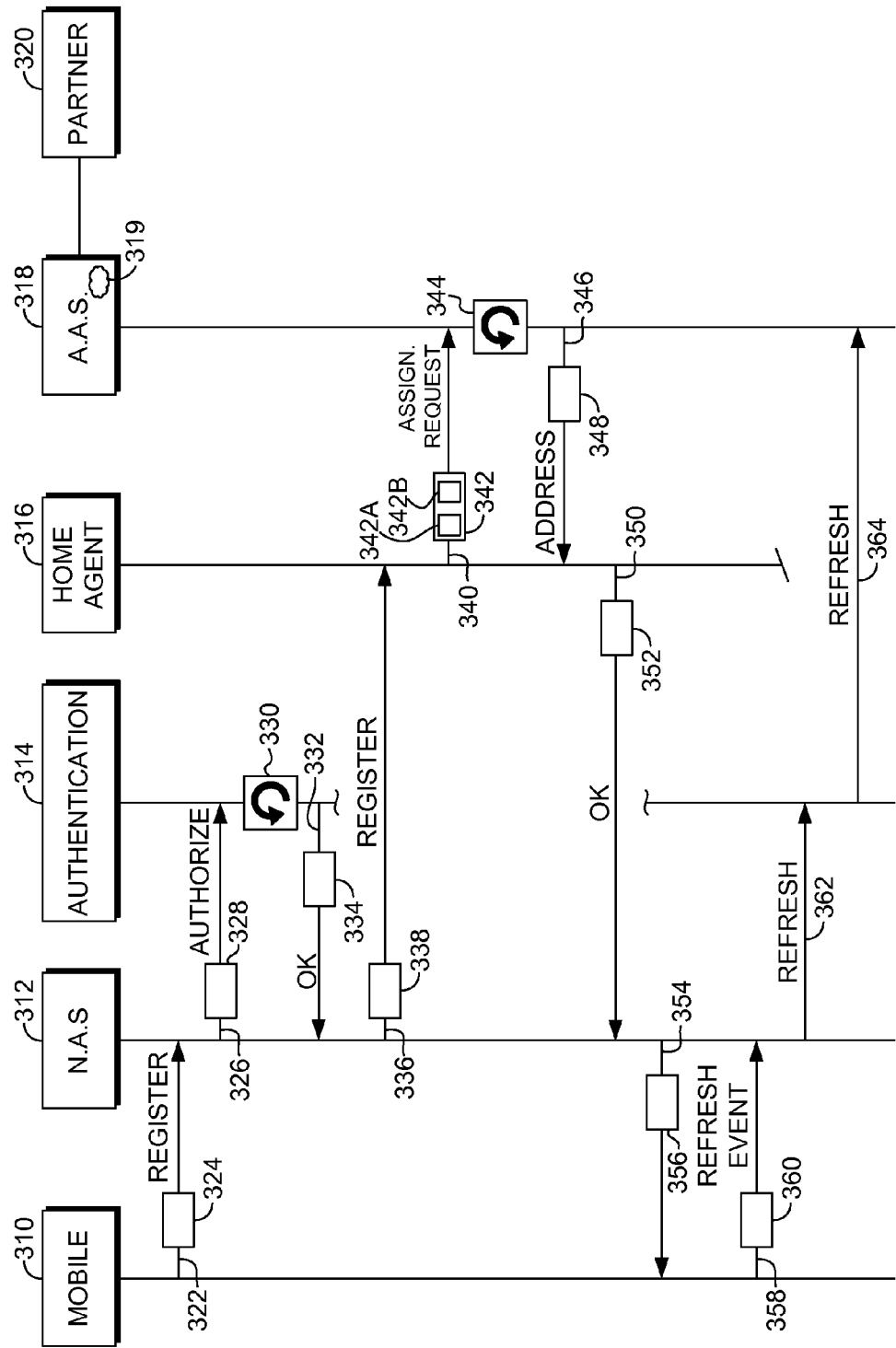
FIG. 3 depicts an illustrative flow diagram for intelligently allocating an IP address to a mobile device according to an embodiment of the present invention.

Turning now to FIG. 3, an illustrative method for intelligently assigning an IP address to a mobile device is provided. FIG. 3 depicts a mobile device 310, a network access server 312, an authentication server 314, a home agent 316, an address allocation server 318 that includes an application 319, as well as a partner 320 that might partner with a telecommunications-service provider to provide access to a pool of IP addresses. These various devices are similar to the devices in FIG. 2.

At a step 322, mobile device 310 communicates a registration request 324 to network-access server 312. The network-access server, at a step 326, submits an authorization request 328 to authentication server 314, which determines at a step 330 whether mobile device 310 was allowed to communicate via the wireless telecommunications network. If so, it communicates an "OK" message 334 at a step 332 to indicate that mobile device 310 is allowed to communicate via the wireless telecommunications network.

An IP address is to be assigned to mobile device 310. Thus, at a step 336, a request 338 is communicated to home agent 316 requesting an IP address. In an embodiment of our technology, at a step 340, home agent 316 communicates (if it does not do the following itself) an address-assignment request 342 to address allocation server 318. The address-assignment request includes a device identifier 342A as well as a user identifier 342B. Application 319 then applies a set of rules at a step 344 to determine an IP address that should be allocated to mobile device 310. As previously mentioned, this set of rules could contemplate one or more of the device ID 342A, user ID 342B, or other information such as geographic location, or other contextually relevant information such as time of day, etc.

Based on the rules, at a step 346, address-allocation server 318 communicates an IP address 348 to home agent 316, which passes 350 the IP address 352 to the network-access server. Again, had home agent 316 performed the functionality offered by address-allocation server 318, then it would determine an IP address itself and communicate it to the network access server 312, which at a step 354, communicates the IP address 356 to mobile device 310, which registers it.

Periodically, mobile device 310 indicates that it is to retain or sever a connection that it has to the Internet for example, which would translate to disposing of the IP address 356 that it received. These are often referred to as refresh events. Our technology contemplates cascading information associated with refreshed events all the way to the home agent or address allocation server as applicable to enrich its knowledge of behavior regarding maintaining allocated IP addresses. Thus, at a step 358, information 360 associated with a refresh event is communicated to network address server 312, which passes 362 the information 364 ultimately to address allocation server 318. In this way, a record can be developed that stores information related to the success or failures associated with IP address 356 being assigned to mobile device 310. For example, list 240 and prior mobile IP addresses can be maintained as well as information associated with those addresses.

Turning now to FIG. 4, an illustrative method for intelligently allocating an IP address to a mobile device is provided. At a step 410, a registration request is received that requests that an address be assigned to the mobile device, such as mobile device 212. At a step 412, certain factors are considered to determine a mobile IP address that is to be assigned to the mobile device. We have previously mentioned several illustrative factors that could be considered in various embodiments of the invention. Examples include a refresh rate associated with the registration request, a frequency that a client application running on the mobile device has been disconnected from the network, an availability of mobile IP addresses remaining in a pool of mobile IP addresses, a type of application that the client application is, a location of a novel(?) device when the request is received, and a certain set of mobile IP addresses that have functioned well in the past.

A refresh rate is associated with a registration request such that multiple refresh events might indicate that a problem exists with a connection that the mobile device has to the Internet, which problem might be caused by the IP address allocated to it. Thus a higher refresh rate would indicate that a previously assigned or even currently assigned mobile IP address should be flagged or otherwise logged as an IP address that should not be used again at least for the given mobile device.

A frequency that a client application, such as application 220, has been disconnected is another criterion that can be used to determine what mobile IP address should be allocated to mobile device 212. If the client application becomes disconnected from whatever other client applications it's communicating with, then it's possible that its mobile IP address is to blame. Thus a client application that frequently requests a new IP address would tend to indicate that the original IP address would not be used later. A low frequency of disconnections indicate that the current IP address works well. Thus, if that IP address is available to be reallocated to the requested mobile device, then it should be.

We have previously mentioned that certain pools of mobile IP addresses can be used. If IP addresses are available in those prescribed pools, then one of them should be allocated to mobile device 212.

Sometimes, the type of allocation that application 220 is becomes a factor in determining what IP address should be allocated to the device. For example, if the application is one that is latent sensitive, such as communicating voice by way of IP packets, then an IP address that has a reputation of being a good IP address should be allocated. But if the application is more tolerant of intermittent delays, such as an e-mail or browser application, then perhaps a new, untested IP address could be assigned to mobile device 212.

At a step 414, a determination of a mobile IP address is made. That is, a mobile IP address is selected based on the rules and criteria provided. This mobile IP address is conveyed at a step 416 to the mobile device.

Turning now to FIG. 5, another illustrative method for intelligently assigning a mobile IP address is provided. At a step 510, a request is received for an IP address to be allocated to a mobile device. At a step 512, allocation criteria are received from a data structure embodied on a memory component. By way of example, the data structure could take the form of component 248 as well as being part of application 236, which might reside on home agent 232. This allocation criteria is the criteria that is used to allocate an IP address to mobile device 212. In one embodiment, the allocation criteria include conditions to be used in connection with allocation of the IP address to the mobile device. As mentioned, the conditions could be based on a unique identifier that identifies the mobile device, and more. At a step 514, a specific IP address is assigned to the mobile device based on the criteria.

Turning now to FIG. 6, another method for intelligently assigning a mobile IP address to a mobile device is provided. At a step 610, a request is received to have a mobile IP address assigned to a mobile device. This request is fulfilled at a step 612 based on device information contained in the request. As previously mentioned, device information could include a device identifier that uniquely identifies mobile device 212 as well as a user ID that identifies a user associated with the device.

Many different arrangements of the various components depicted, as well as components not shown, are possible without departing from the scope of the claims below.

Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media having computer-executable instructions embodied thereon that, when executed, perform a method of allocating an identifier to a mobile device, the method comprising:
   receiving a registration request, which requests that an address be assigned to the mobile device, thereby enabling it to communicate data by way of a wireless telecommunications network;
   considering the following factors in connection with determining a mobile IP (MIP) address to be assigned to the mobile device, which runs a client application that makes use of the MIP address,
   (1) a refresh rate associated with the registration request;
   (2) a frequency that the client application running on the mobile device has been disconnected from the network;
   (3) an availability of MIP addresses remaining in a pool of MIP addresses;
   (4) a type of application that the client application is;
   (5) a location of the mobile device when the request is received;
   (6) a certain set of MIP addresses that have functioned well in the past;
   determining the MIP address;
   conveying the MIP address to the mobile device such that the mobile device is identifiable on the network by way of the MIP address; and
   monitoring a communications channel that was established by virtue of conveying the MIP address to the mobile device, wherein monitoring the communications channel includes:
      logging whether the communications channel is disrupted,
      logging a given MIP address that was allocated at a time of disruption of the communications channel, and
      repeatedly logging the given MIP addresses, which might be different from each other, thereby storing a first set of MIP addresses that resulted in relatively stable connections and a second set of MIP addresses that resulted in relatively unstable connections.

2. The media of claim 1, wherein the mobile device was authenticated by an authenticating device that determines whether it is authorized to communicate via the wireless telecommunications network ("network").

3. The media of claim 1, wherein the refresh rate includes a measure of a number of times that data are refreshed on the mobile device.

4. The media of claim 1, wherein the frequency includes a number of occurrences during a given time period that the mobile device attempted to reregister with the wireless telecommunications network.

5. The media of claim 1, wherein the pool of MIP addresses includes a dedicated pool of addresses to be allocated among a set of mobile devices that share a common attribute.

6. The media of claim 5, wherein the common attribute includes ownership, such that a first set of mobile devices commonly owned by an entity is allocated IP addresses from the pool.

7. The media of claim 1, wherein the certain set of MIP addressees includes addresses that when previously assigned did not result in excessive reregistration attempts.

8. The media of claim 7, wherein the excessive reregistration attempts is defined by a threshold number per unit time.

9. The media of claim 8, wherein the threshold number is any number above about 10% of user-driven disconnections from the wireless telecommunications network.

10. A computer-implemented method of allocating an identifier to a mobile device, the method comprising:
   receiving a registration request, which requests that an address be assigned to the mobile device, thereby enabling it to communicate data by way of a wireless telecommunications network;
   considering the following factors in connection with determining a mobile IP (MIP) address to be assigned to the mobile device, which runs a client application that makes use of the MIP address,
      (1) a refresh rate associated with the registration request;
      (2) a frequency that the client application running on the mobile device has been disconnected from the network;
      (3) an availability of MIP addresses remaining in a pool of MIP addresses;
      (4) a type of application that the client application is;
      (5) a location of the mobile device when the request is received;
      (6) a certain set of MIP addresses that have functioned well in the past;
   determining the MIP address;
   conveying the MIP address to the mobile device such that the mobile device is identifiable on the network by way of the MIP address; and
   monitoring a communications channel that was established by virtue of conveying the MIP address to the mobile device, wherein monitoring the communications channel includes:
      logging whether the communications channel is disrupted,
      logging a given MIP address that was allocated at a time of disruption of the communications channel, and
      repeatedly logging the given MIP addresses, which might be different from each other, thereby storing a first set of MIP addresses that resulted in relatively stable connections and a second set of MIP addresses that resulted in relatively unstable connections.

11. The method of claim 10, wherein the mobile device was authenticated by an authenticating device that determines whether it is authorized to communicate via the wireless telecommunications network ("network").

12. The method of claim 10, wherein the refresh rate includes a measure of a number of times that data are refreshed on the mobile device.

13. The method of claim 10, wherein the frequency includes a number of occurrences during a given time period that the mobile device attempted to reregister with the wireless telecommunications network.

14. The method of claim 10, wherein the pool of MIP addresses includes a dedicated pool of addresses to be allocated among a set of mobile devices that share a common attribute.

15. The method of claim 14, wherein the common attribute includes ownership, such that a first set of mobile devices commonly owned by an entity is allocated IP addresses from the pool.

16. The method of claim 10, wherein the certain set of MIP addressees includes addresses that when previously assigned did not result in excessive reregistration attempts.

17. The method of claim 16, wherein the excessive reregistration attempts is defined by a threshold number per unit time.

18. The method of claim 17, wherein the threshold number is any number above about 10% of user-driven disconnections from the wireless telecommunications network.

19. A home agent configured to execute a method of allocating an identifier to a mobile device, the method comprising:
   receiving a registration request, which requests that an address be assigned to the mobile device, thereby enabling it to communicate data by way of a wireless telecommunications network;
   considering the following factors in connection with determining a mobile IP (MIP) address to be assigned to the mobile device, which runs a client application that makes use of the MIP address,
      (1) a refresh rate associated with the registration request;
      (2) a frequency that the client application running on the mobile device has been disconnected from the network;
      (3) an availability of MIP addresses remaining in a pool of MIP addresses;
      (4) a type of application that the client application is;
      (5) a location of the mobile device when the request is received;
      (6) a certain set of MIP addresses that have functioned well in the past;
   determining the MIP address;
   conveying the MIP address to the mobile device such that the mobile device is identifiable on the network by way of the MIP address; and
   monitoring a communications channel that was established by virtue of conveying the MIP address to the mobile device, wherein monitoring the communications channel includes:
      logging whether the communications channel is disrupted,
      logging a given MIP address that was allocated at a time of disruption of the communications channel, and
      repeatedly logging the given MIP addresses, which might be different from each other, thereby storing a first set of MIP addresses that resulted in relatively stable connections and a second set of MIP addresses that resulted in relatively unstable connections.

* * * * *